United States Patent [19]
Greiff et al.

[11] Patent Number: 5,331,852
[45] Date of Patent: Jul. 26, 1994

[54] ELECTROMAGNETIC REBALANCED MICROMECHANICAL TRANSDUCER

[75] Inventors: Paul Greiff, Wayland; Burton Boxenhorn, Chestnut Hill, both of Mass.

[73] Assignee: The Charles Stark Draper Laboratory, Inc., Cambridge, Mass.

[21] Appl. No.: 807,726

[22] Filed: Dec. 16, 1991

Related U.S. Application Data

[63] Continuation-in-part of Ser. No. 757,706, Sep. 11, 1991.

[51] Int. Cl.⁵ .................... G01P 9/04; G01P 15/13
[52] U.S. Cl. .................... 73/505; 73/517 B; 73/862.61
[58] Field of Search ........... 73/517 B, 505, 862.61, 73/517 A, 517 R, 517 AV, 862.59, DIG. 1, 778, 779

[56] References Cited

U.S. PATENT DOCUMENTS

| | | | |
|---|---|---|---|
| Re. 32,931 | 5/1989 | Staudte | 73/505 |
| Re. 33,479 | 12/1990 | Juptner et al. | 73/505 |
| 3,053,095 | 9/1962 | Koril et al. | 73/504 |
| 3,151,486 | 10/1964 | Plummer | 73/517 B |
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,321,500 | 3/1982 | Paros et al. | 73/DIG. 1 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 8/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |

(List continued on next page.)

FOREIGN PATENT DOCUMENTS 55-121728 9/1980 Japan .

(List continued on next page.)

OTHER PUBLICATIONS

Barth, P. W. et al., "A Monolithic Silicon Accelerometer With Integral Air Damping and Overrange Protection," 1988 IEEE, pp. 35–38.

(List continued on next page.)

Primary Examiner—John E. Chapman
Attorney, Agent, or Firm—Weingarten, Schurgin, Gagnebin & Hayes

[57] ABSTRACT

A method and apparatus for electromagnetically rebalancing a micromechanical transducer via a plurality of current carrying electrodes disposed beneath or above the transducer interacting with a current carrying conductor disposed on the transducer. In a first embodiment, the micromechanical transducer comprises a micromechanical accelerometer having electromagnetic rebalance of an asymmetric plate. In an alternative embodiment, the transducer comprises a micromechanical gyroscope having electromagnetic driving of an outer gimbal and electromagnetic rebalance of a sense gimbal.

19 Claims, 6 Drawing Sheets

U.S. PATENT DOCUMENTS

| | | | |
|---|---|---|---|
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 7/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,912,990 | 4/1990 | Norling | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,016,072 | 5/1991 | Greiff | 357/26 |
| 5,060,039 | 10/1991 | Weinberg et al. | 73/517 R |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,205,171 | 4/1993 | O'Brien et al. | 73/517 B |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |
| 6,893,509 | 1/1990 | MacIver et al. | 73/517 AV |

FOREIGN PATENT DOCUMENTS

| | | |
|---|---|---|
| 58-136125 | 8/1983 | Japan . |
| 59-037722 | 3/1984 | Japan . |
| 59-158566 | 9/1984 | Japan . |
| 61-144576 | 7/1986 | Japan . |
| 62-071256 | 8/1987 | Japan . |
| 62-221164 | 9/1987 | Japan . |
| 63-169078 | 7/1988 | Japan . |
| 2183040 | 5/1987 | United Kingdom . |

OTHER PUBLICATIONS

Boxenhorn, B., et al., "An Electrostatically Rebalanced Micromechanical Accelerometer," AIAA Guidance, Navigation and Control Conference, Boston, Aug. 14–16, 1989, pp. 118–122.

Boxenhorn, B., et al., "Micromechanical Inertial Guidance System and its Application," Fourteenth Biennial Guidance Test Symposium, vol. 1, Oct. 3–5, 1989, pp. 113–131.

Boxenhorn, B., et al., "Monolithic Silicon Accelerometer," *Transducers '89*, Jun. 25–30, 1989, pp. 273–277.

Boxenhorn, B., et al., "A Vibratory Micromechanical Gyroscope," AIAA Guidance, Navigation and Control Conference, Minneapolis, Aug. 15–17, 1988, pp. 1033–1040.

Howe, R., et al., "Silicon Micromechanics: Sensors and Actuators On a Chip," IEEE Spectrum, Jul. 1990, pp. 29–35.

Moskalik, L., "Tensometric Accelerometers with Overload Protection," Meas. Tech. (USA), vol. 22, No. 12, Dec. 1979 (publ. May 1980), pp. 1469–1471.

Nakamura, M., et al., "Novel Electrochemical Micro-Machining and Its Application for Semiconductor Acceleration Sensor IC," *Digest of Technical Papers* (1987) Institute of Electrical Engineers of Japan, pp. 112–115.

Petersen, K. E. et al., "Micromechanical Accelerometer Integrated with MOS Detection Circuitry," IEEE, vol. ED–29, No. 1 (Jan. 1982), pp. 23–27.

Petersen, Kurt E., et al., "Silicon as a Mechanical Material," *Proceedings of the IEEE*, vol. 70, No. 5, May 1982, pp. 420–457.

"Quartz Rate Sensor Replaces Gyros," *Defense Electronics*, Nov. 1984, p. 177.

Rosen, Jerome, "Machining In the Micro Domain," *Mechanical Engineering*, Mar. 1989, pp. 40–46.

ELECTROMAGNETIC REBALANCED MICROMECHANICAL TRANSDUCER

RELATED APPLICATIONS

This application is a continuation-in-part of U.S. patent application Ser. No. 07/757,706, filed Sep. 11, 1991.

FIELD OF THE INVENTION

The present invention relates to micromechanical transducers, in particular, to a method and apparatus to sense and torque to rebalance micromechanical transducers, electromagnetically.

BACKGROUND OF THE INVENTION

Micromechanical or semiconductor fabrication techniques are known for producing micromechanical transducers such as accelerometers, gyroscopes, pressure sensors and the like. Generally, a micromechanical transducer element, fabricated by doping and selectively etching semiconductor materials, is displaced by a parameter (e.g., inertia, pressure) the magnitude of which is to be determined. The amount of displacement may be made linearly proportional and output as an indication of the magnitude of the desired parameter. Typically, such transducers are "rebalanced" or driven back to a null or rest position by applying a voltage to the transducer element. This kind of "electrostatic" rebalance is exemplified in U.S. Pat. No. 4,483,194 to Rudolf, which discloses electrodes parallel to the plane of a semiconductor carrier, which apply the electrostatic rebalance torque to the transducer element.

However, electrostatic rebalance using only electrodes below the transducer element may result in an uneven net force between the transducer and the electrodes, causing asymmetric attractive forces therebetween, resulting in undesirable scale factor variation with input and torque bias.

Electrodes may be implemented above and below the transducer element with top to bottom symmetry to preclude uneven net force. However, fabricating symmetrical electrodes above the transducer element adds significant, additional processing steps and resultant cost.

SUMMARY OF THE INVENTION

The present invention provides a method and apparatus for rebalancing a micromechanical transducer using electrodes disposed beneath the transducer element and a current carrying conductor disposed thereon.

According to the invention, a plurality of electrodes disposed beneath the transducer interact electromagnetically with a current carrying conductor disposed on the transducer, to effect rebalance thereof. The electrodes beneath the transducer are configured to carry a large current while the conductor disposed on the transducer carries a relatively small current. Therefore, a large force can be applied electromagnetically to a transducer element by applying only a small current and a potentially large dynamic range of the transducer element is realizable.

BRIEF DESCRIPTION OF THE DRAWING

A complete understanding of the advantages and features of the invention can be more readily obtained by reference to the following detailed description when considered in conjunction with the accompanying drawings wherein.

DETAILED DESCRIPTION OF THE INVENTION

Displacement of an element of a micromechanical transducer may be effected and sensed using electromagnetic forces. The principle according to the invention may be applied to generate forces necessary to rebalance or torque or excite a variety of micromechanical elements in the context of a variety of micromechanical transducers. In particular, electromagnetic rebalance torquing and sensing can be applied in the context of a micromechanical gyroscopic transducer such as taught in U.S. patent application Ser. No. 07/493,327, (issued as U.S. Pat. No. 5,016,072) and in the context of a micromechanical accelerometer such as taught in U.S. patent application Ser. No. 07/528,051, which are incorporated herein by reference.

Figure 1:
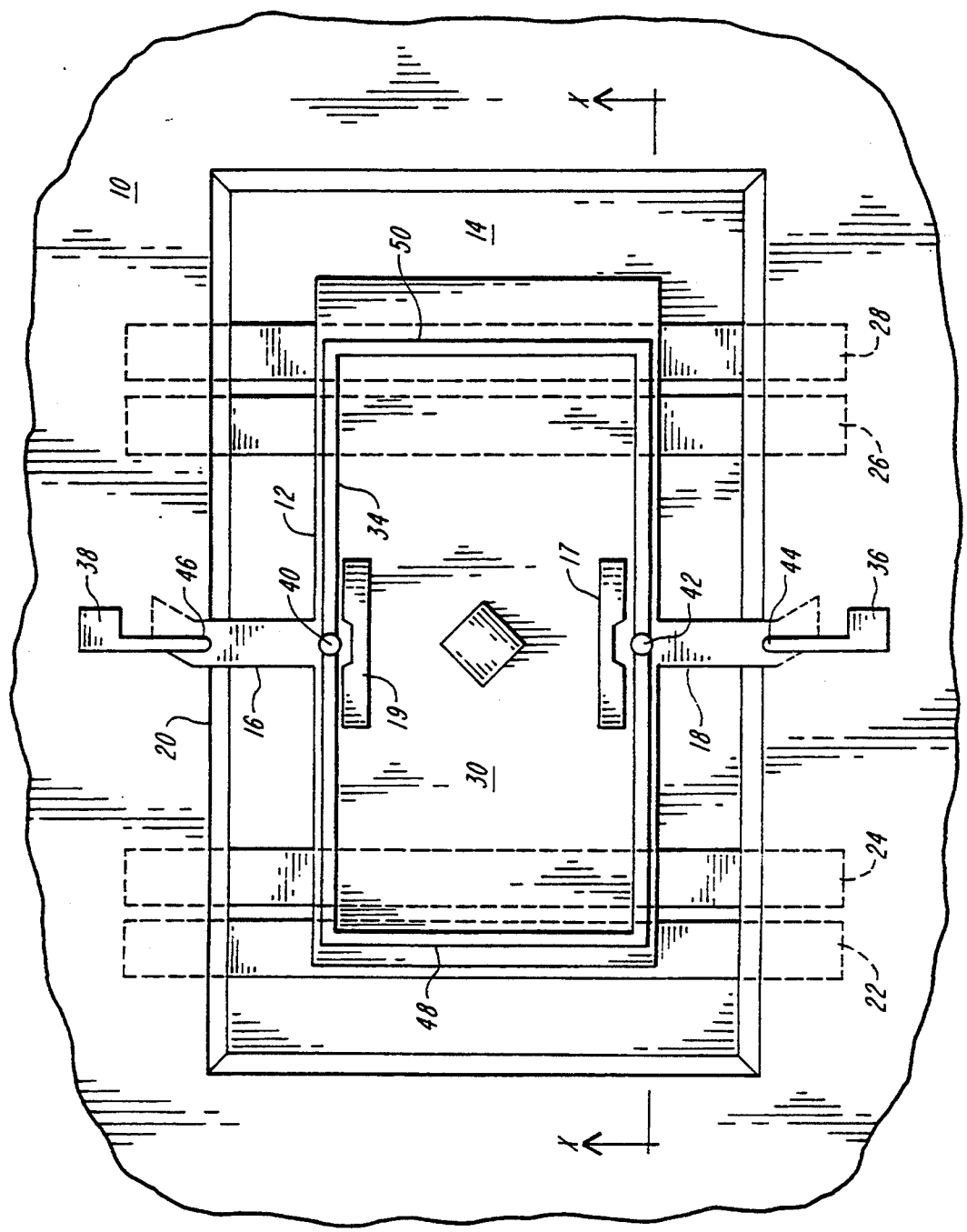
FIG. 1 is a top view of a micromechanical accelerometer having electromagnetic rebalance according to the invention.
Figure 2:
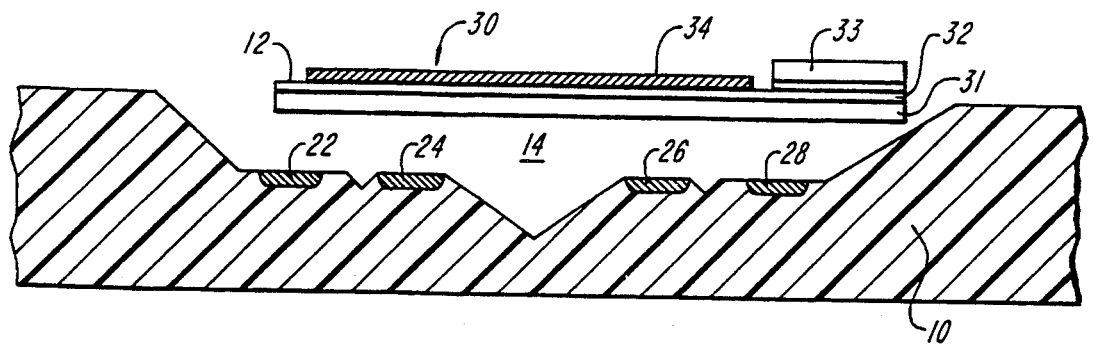
FIG. 2 is a cross-section of the transducer of FIG. 1 taken along line X—X.

Referring now to FIGS. 1 and 2, a micromechanical transducer according to the invention, such as an accelerometer, comprises a mass of N-type silicon 10 which is selectively doped and etched to yield a transducer element 12 suspended above a void 14. Selective doping and etching, as known in the art, is used to provide flexible linkages 16, 18 which connect transducer element 12, the tilt plate, to a frame 20 which defines void 14. Linkages 16, 18 and transducer element 12 remain intact as P-type regions by virtue of the doping which permits selective etching thereabout such that the transducer element 12 is free to rotate about an axis formed by the linkages 16, 18. Slots 17, 19, selectively etched through the transducer element 12 create beams which provide tension relief of the transducer which is in tension because of the reduced lattice spacing of the P-type doped regions.

A plurality of electrodes 22, 24, 26, 28 are fabricated as P-type regions integral to N-type mass 10. The P-type integral electrodes are fabricated by doping P-type regions on an underlying N-type mass onto which additional N-type mass is epitaxially grown prior to selective doping and etching free transducer element 12. The integral electrodes are positioned to lie beneath transducer element 12 proximate to the ends thereof. It is also possible to use all bridge electrodes or various combinations of bridge and buried electrodes to accomplish the electrode function.

Figure 1A:
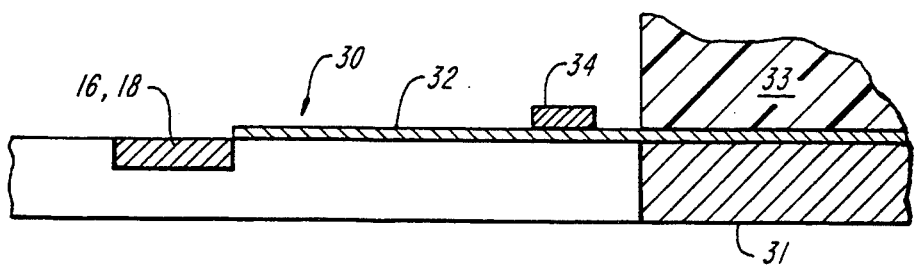
FIG. 1A is a partial side view of an elongated end of the transducer element of FIG. 1.

Transducer element 12 comprises a P-type plate 30 which remains after selective etching. As viewed in FIGS. 1 and 1A, plate 30 is suspended by the flexure pivots asymmetrically, so as to make it pendulous, and thus sensitive to acceleration. An insulating or dielectric layer 32 of oxide may be deposited on the plate 30 extending out onto an extension 31. Preferably a layer of silicon nitride is used as the insulating layer because, as compared with silicon oxide, a nitride layer will not leach boron dopant and therefore does not affect the etch resistance of the structure. A layer of polysilicon 33 is disposed on the extension 31 and serves to decrease cross axis sensitivity of the plate 30 by causing the center of gravity of the plate 30 to be shifted upwardly, proximate to the center of the flexible linkages 16, 18.

A current carrying conductor 34, comprising a continuous layer of typically titanium-tungsten/gold metallized onto insulating layer 32, is patterned as a rectangular metallization on a top surface of the transducer element 12. Conductor 34 is electrically accessible via linkages 16, 18 which are, as indicated hereinbefore, highly doped P-type and therefore conducting. The P-type linkages 16, 18 are electrically connected to metallizations forming current carrying conductor 34 and surface bonding pads 36, 38 by ohmic contacts 40, 42, 44 and 46. The ohmic contacts 40, 42, 44 and 46 provide a metal-to-semiconductor contact and facilitate electrical paths having minimal resistance to current carrying conductor 34.

Figure 1B:
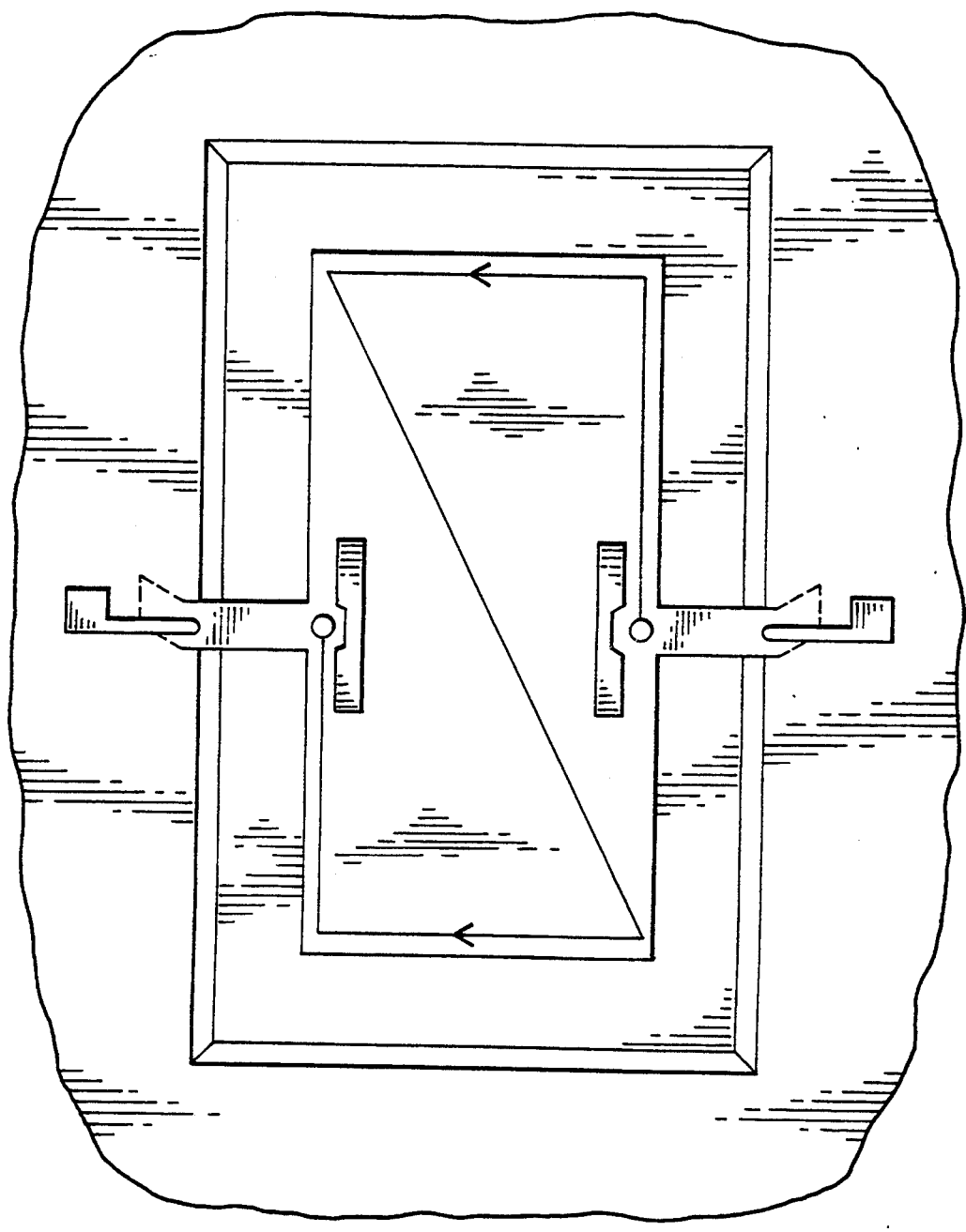
FIGS. 1B and 1C are alternative configurations for a current carrying conductor disposed on the accelerometer of FIG. 1.
Figure 1C:
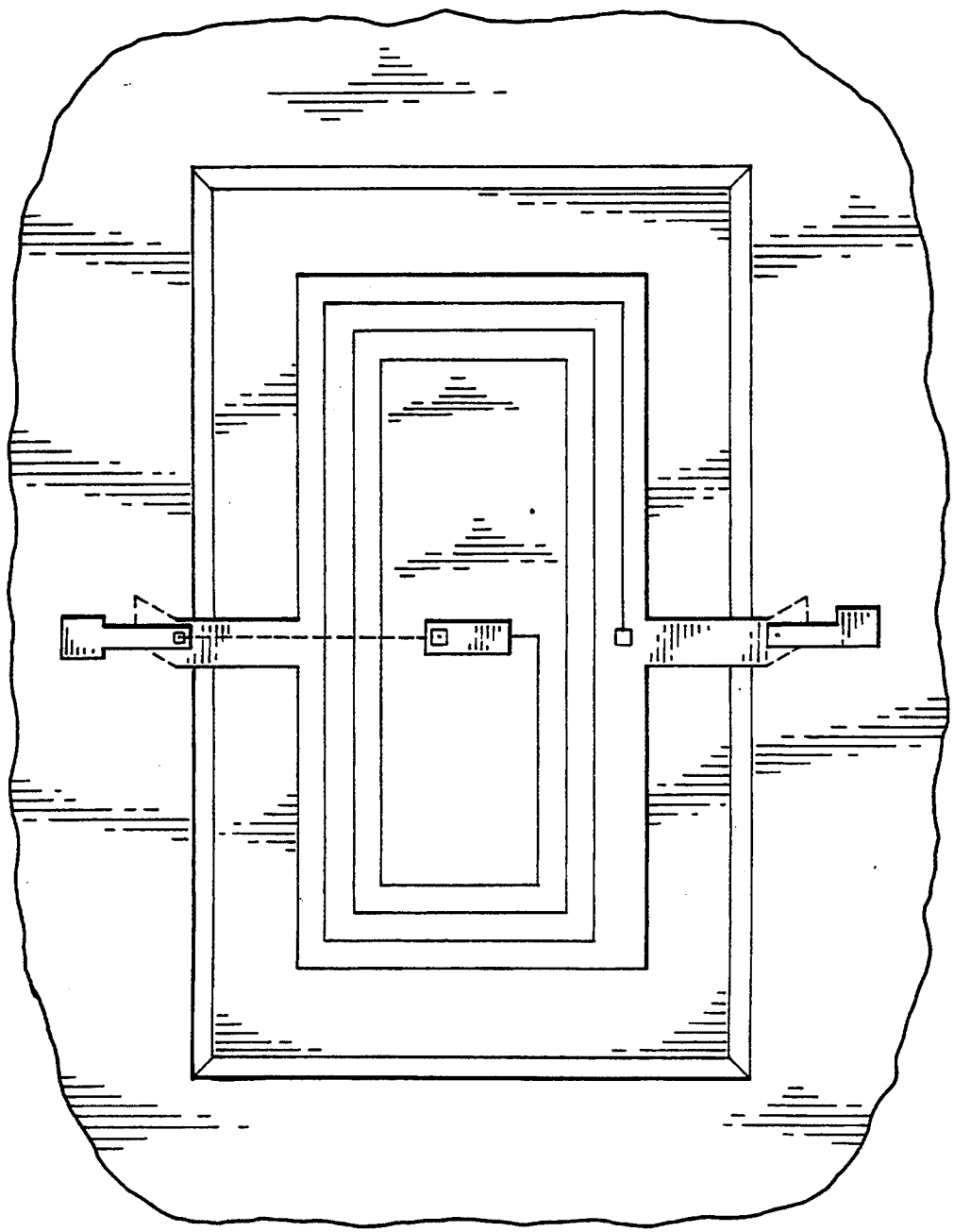

Alternate current carrying conductor configurations can be used. As illustrated in FIG. 1B, the conductor 34 may be configured as a single path criss-crossing the plate 30. In such a case, current splitting is not a critical factor as the same current flows at opposite sides of the plate 30. FIG. 1C illustrates that the current carrying conductor 34 may be configured as a coil or series of windings, which will result in greater electromagnetic lines of force per unit of current, being sent through each of the opposing ends of the plate 34. In either of the alternative conductor configurations, it is important that the current at opposite ends of the plate be substantially equal. Therefore, in the case of the coil configuration it is important that the number of windings at each end of the plate be the same.

Figure 3:
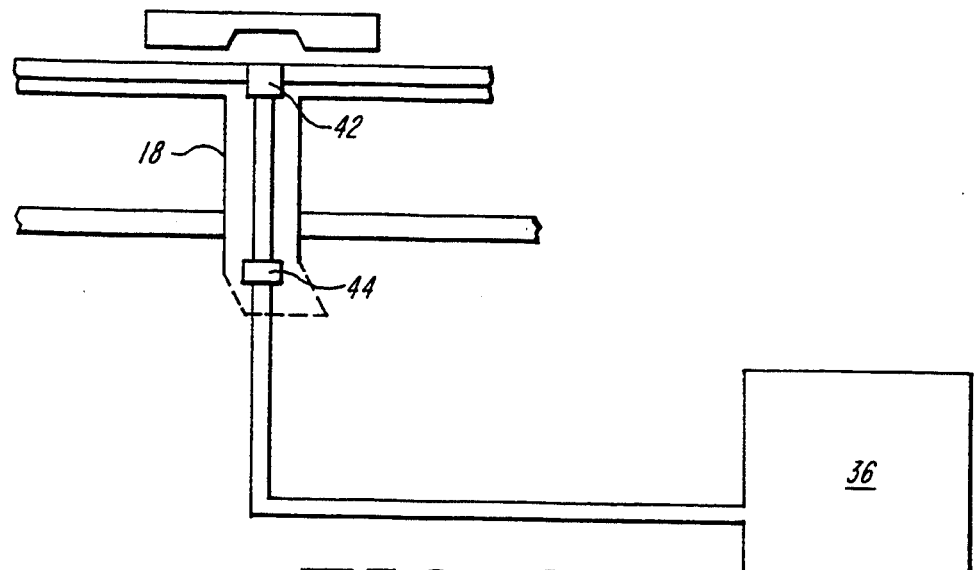
FIG. 3 is an expanded view of a flexure/conductor junction of the transducer of FIG. 1.

A metallization across the flexible linkages to the current carrying conductor, as shown in FIG. 3, may be provided to effect electrical continuity thereto. However, a metallization across the linkages would be subject to the dynamics of transducer element 12 having a possible undesirable impact thereon. Further, the integrity of a metallization subject to the twisting dynamics of the linkages would likely be compromised over time.

Figure 4:
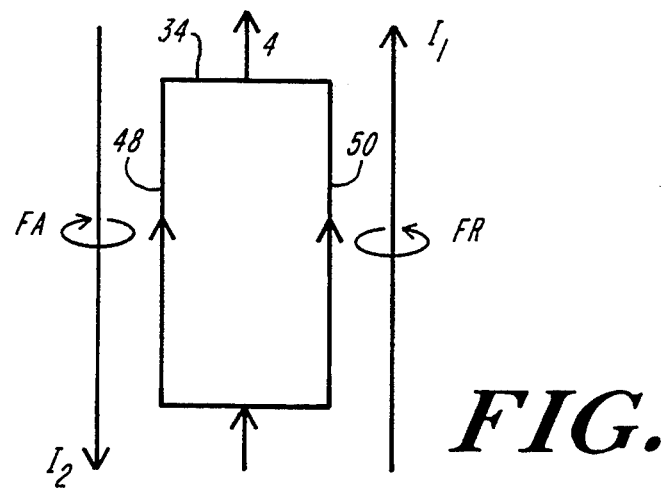
FIG. 4 is a diagrammatic representation of the electromagnetic rebalance principle according to the invention.
Figure 5:
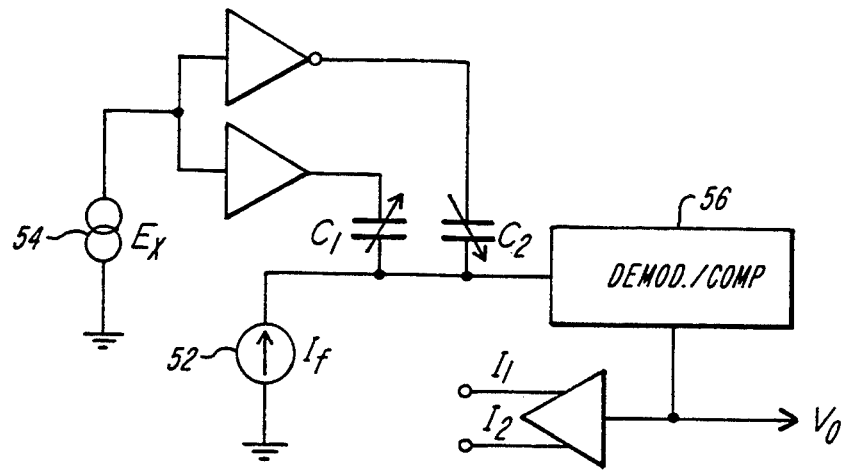
FIG. 5 is a diagrammatic representation of electromagnetic control electronics for the accelerometer of FIG. 1.

Referring now to FIGS. 2, 4 and 5, the principles of electromagnetic attraction and repulsion are applied in a micromechanical transducer according to the invention using the structural elements discussed hereinbefore. A small fixed d.c. current in the range of approximately 0.01 to 1 milliamp (dependant on device size) is directed through current carrying conductor 34 via metallized pads 36, 38 and linkages 16, 18. A large controllable current in a range of approximately 10 to 100 milliamps is induced in the outer buried electrodes 22, 28. The current through the outer electrodes will vary depending on the amount of displacement of the transducer element 12 and the amount of force necessary to drive the transducer element 12 back to null or rest position.

The fundamental principles of electromagnetic fields dictate that the magnetic field about the buried electrodes 22, 28 will be proportional to the current flowing therethrough. The resultant repulsive FR or attractive FA force will be the product of the fixed current $I_f$ through the current carrying conductor 34 and the currents $I_1$, $I_2$ through the buried electrodes 22, 28, respectively. As long as the currents $I_1$, $I_2$ through buried electrodes 22, 28 are equal in magnitude but opposite in direction, their respective products relative to fixed current $I_f$ will result in linear repulsive/attractive or push/pull forces on transducer element 12. Substantial physical uniformity of the current carrying conductor 34 may assure equal current flow through extreme branched sides 48, 50 of the current carrying conductor 34. If non-uniformity of current flow through branched ends 48, 50 exists, because of some physical variation or fixed resistive bias, current flow through the electrodes 22, 28 may be electronically calibrated to compensate therefor. The configuration shown in FIGS. 1B and 1C assures that the current flowing on either side of the plate is the same, which avoids problems associated with non-uniformity of the plate current carrying element.

An electronic network, as illustrated in FIG. 5, implements a feedback loop which establishes the opposing currents $I_1$, $I_2$ flowing through the buried torque electrodes 22, 28 of the electromagnetically rebalanced micromechanical accelerometer FIG. 1. A d.c. current source 52 generates the fixed current $I_f$ which flows through the current carrying conductor 34. A voltage source 54 generates an alternating current excitation signal, which is typically 100 KHz. The excitation signal is differentially applied to opposite ends of the accelerometer plate 30, via buried electrodes 24, 26 which can act to sense the angular position of the plate 30. In a sense mode, the electrodes 24, 26 are represented electrically as variable capacitors C1, C2, as the capacitance between the plate 30 and buried electrodes 24, 26 will vary with the distance therebetween. The signal sensed from the plate 30 comprises the a.c. sense signal and is superimposed on the d.c. current applied to the current carrying conductor 34 on the plate 30. Amplification and demodulation circuitry 56, amplifies the signal sensed by the buried electrodes 24, 26, and by demodulation the a.c. sense signal is separated from the d.c. signal. Additional filtering, and compensation, are provided such that a signal is derived which is a voltage Vo proportional to the torque necessary to rebalance the plate 30 and therefore also proportional to the acceleration input. The voltage proportional. to acceleration Vo is used to generate the differential currents which produce the rebalance torque, shown schematically by amplifier 58. These currents are then applied to buried electrodes 22, 28 as currents $I_1$, $I_2$, substantially equal in magnitude but opposite in direction, as discussed hereinbefore.

Figure 6A:
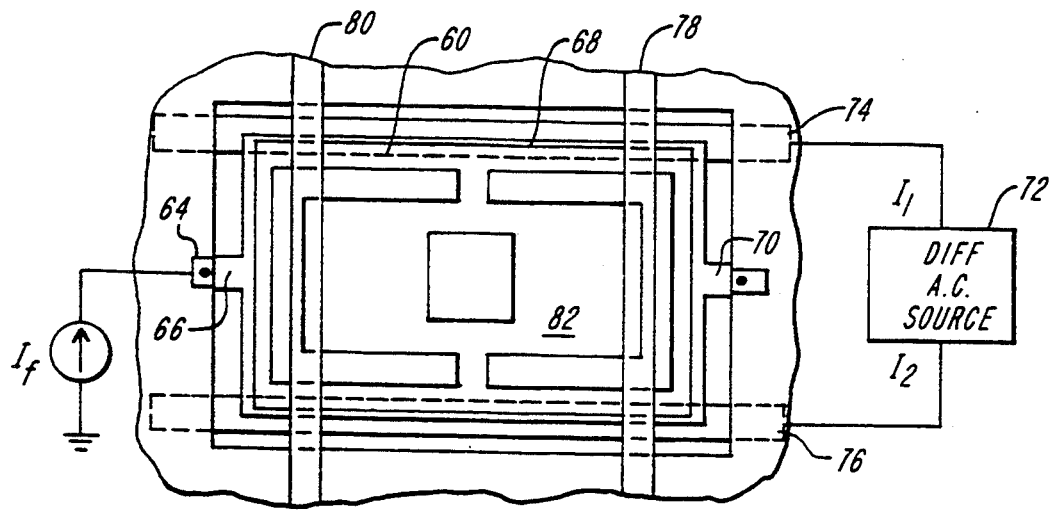
FIG. 6A is a top view of a micromechanical gyroscopic transducer having electromagnetic driving of a motor axis.
Figure 6B:
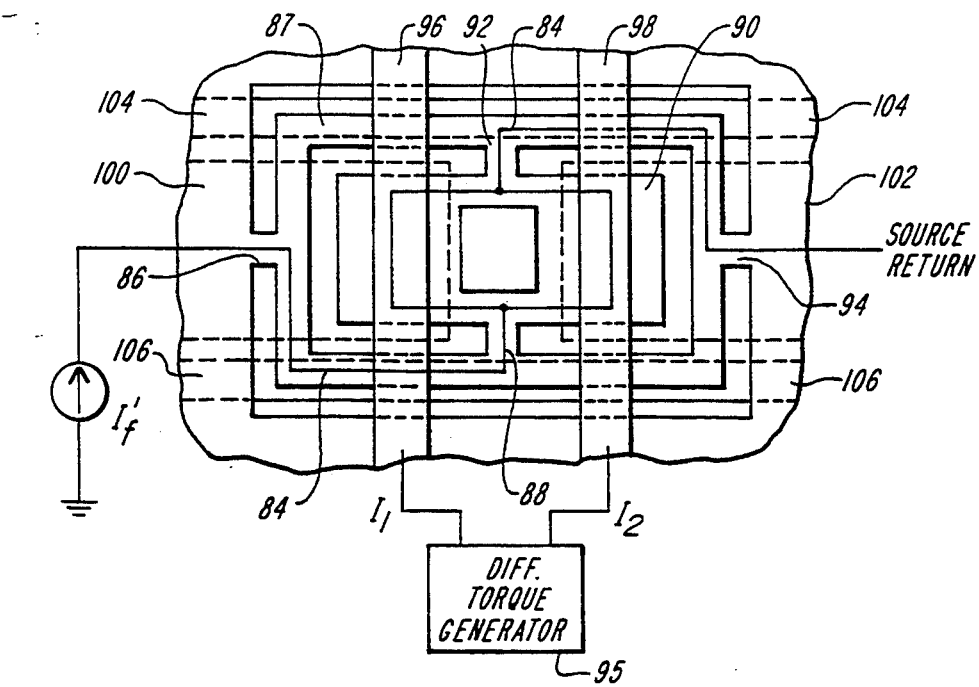
FIG. 6B is a micromechanical gyroscope having electromagnetic rebalance of the sense axis.
Figure 6C:
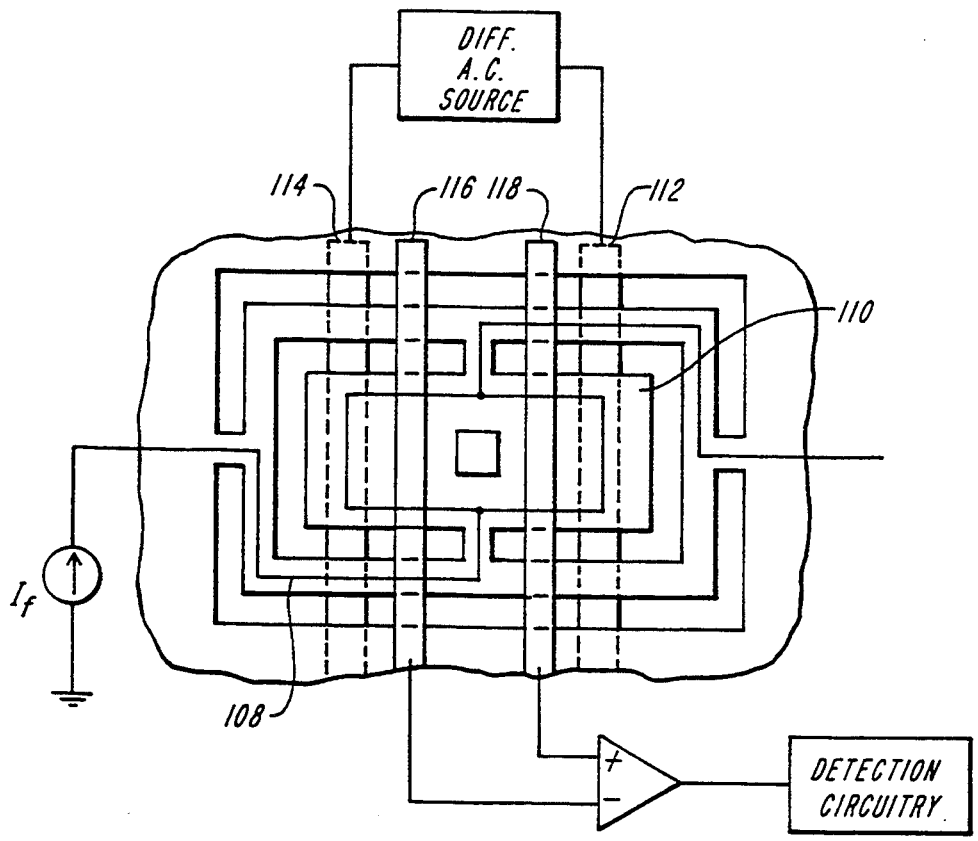
FIG. 6C is a micromechanical gyroscope illustrating electromagnetic sensing.

Electromagnetic principles and forces according to the invention can be applied in the context of a micromechanical gyroscopic transducer, as illustrated in FIGS. 6A, 6B, and 6C. Electromagnetic forces can be used, in conjunction with electrostatic sensing or alone, to: drive the gyroscope motor axis; rebalance the gyroscope resonator axis; and sense displacement in either element of the gyroscope.

An electromagnetically driven outer gimbal is illustrated in the gyroscopic transducer of FIG. 6A. A fixed d.c. current $I_f$ is supplied to the outer gimbal 60 via an ohmic contact 64 to a flexure 66. The fixed current $I_f$ is carried on the outer gimbal 60 in a current carrying conductor 68 to an opposing flexure 70. An alternating current is provided by an a.c. source 72, to a pair of buried electrodes 74, 76 disposed beneath the outer gimbal and proximate to the current carrying conductor 68. The a.c. current flow through the buried electrode 74 is 180 degrees out-of-phase with the a.c. current flowing through the other buried electrode 76, so that the outer gimbal is driven in a push-pull manner, oscillating at a frequency equal to that of the differential a.c. source. A pair of bridge electrodes 78, 80 may be disposed above an inner gimbal 82 of the gyroscope for capacitively sensing inner gimbal 82 displacement.

As illustrated in FIG. 6B, a gyroscopic transducer may nave the sense axis rebalanced electromagnetically, according to the invention. In such a configuration, the fixed d.c. current $I_f$ flows through a current carrying conductor 84 which is routed across a first outer flexure 86 and along the outer gimbal 87 to a first inner flexure 88 and across to the sense member or resonator axis 90. The current carrying conductor 84 is formed in a rectangular pattern on the sense gimbal 90 whereupon the fixed current will split equally through opposing branches of the conductor as with the accelerometer discussed hereinbefore. The conductor 84 is routed across a second inner flexure 92 to the outer gimbal 87 and along to a second outer flexure 94 where it is routed across to the source return. A d.c. differential torque generator 95 provides substantially equal and opposite torque signals to a pair of bridge electrodes 96, 98 which are disposed above the transducer sense gimbal 90, each proximate to a branched end of the current carrying conductor 84 thereon. The differential torque signals $I_1$, $I_2$, can be generated by electronic control loops, as known in the art, which generate a voltage of a magnitude proportional to the capacitively sensed displacement of the resonator 90. Capacitive sensing of the resonator 90 may be effected either by using the bridge electrodes for this purpose or by using a pair of opposing buried electrodes 100, 102 extending beneath the resonator 90. Excitation of the electrodes on the outer gimbal 87 may be effected by buried electrodes 104, 106 disposed at extreme sides beneath the transducer element and proximate to the outer gimbal 87.

FIG. 6C illustrates that electromagnetic forces can be used to sense the position of micromechanical gyroscopic transducer elements. In the configuration shown, a fixed d.c. current $I_f$ flows through a current carrying conductor 108 disposed as a rectangular pattern on inner gimbal 110. A differential a.c. source is applied to a pair of buried electrodes 112, 114 and effects oscillation of the inner gimbal 110 because of the electromagnetic forces discussed hereinbefore. A pair of bridge electrodes 116, 118 disposed above the plate 30 will sense the electromagnetic lines of force about the plate 30. The closer the plate is to a respective bridge electrode, the greater the electromagnetic signal. This sensed signal, which is proportional to the tilt of the plate 30, can be amplified and caused to produce a net force which can rebalance or drive the plate.

One of ordinary skill in the art will appreciate that small electromagnetic forces can and will be affected by various forms of electromagnetic interference. Therefore it should be appreciated that appropriate shielding must be provided in a micromechanical device in order that electromagnetic rebalance torquing and sensing according to the invention will be minimally compromised.

Although it has been disclosed, with respect to the illustrative accelerometer embodiment herein, that asymmetry is achieved by extending one end of transducer plate 30, one of ordinary skill in the art will appreciate that asymmetry could result by adding a mass or weight to one end of a symmetrical plate.

Although the current carrying conductor is described as a patterned rectangular metallization, electromagnetic rebalance according to the invention can be achieved via current flow through any other conductive material which will have electromagnetic lines of force set up thereabout, such as a wire and while the conductor disposed on the pendulous element described hereinbefore was illustrated in rectangular and crisscrossing configurations, it will be appreciated that various other configurations of the conductor can be implemented.

Although the invention has been shown and described with respect to a single crystal, monolithic device, the techniques described may be applied to any method of fabricating a micromechanical structure such as: polysilicon, wafer-wafer bonding, electrochemical, etc.

Although the invention has been shown and described with respect to an illustrative embodiment, thereof, it should be understood by those skilled in the art that the foregoing and various other changes, omissions and additions in the form and detail thereof may be made without departing from the spirit and scope of the invention as delineated in the claims.

What is claimed is:

1. A micromechanical transducer formed from a mass of semiconductor material, comprising:
    a displaceable transducer element having at least one planar surface;
    a current carrying conductor disposed on said at least one planar surface;
    a plurality of electrodes integral to said mass of semiconductor material and disposed proximate to said displaceable transducer element and proximate to said current carrying conductor; and
    at least one current generator providing a fixed current through said current carrying conductor, a first electrode current through one of said plurality of electrodes, and a second electrode current through another of said plurality of electrodes, magnetic fields formed by said first electrode current, said second electrode current and said fixed current, interacting to produce motion of said displaceable transducer element.

2. The micromechanical transducer of claim 1 wherein said displaceable transducer element is selectively etched from silicon.

3. The micromechanical transducer of claim 1 wherein said displaceable transducer element and said plurality of electrodes are constructed in monolithic silicon.

4. The micromechanical transducer of claim 1 wherein said plurality of electrodes are P-type doped silicon electrodes integral to a monolithic mass of N-type silicon from which said displaceable transducer element is selectively etched and said plurality of electrodes are disposed beneath said transducer element.

5. The micromechanical transducer of claim 1 wherein said displaceable transducer is a substantially rectangular planar element fabricated from a mass of silicon and flexibly attached to said mass of silicon by a plurality of linkages.

6. The micromechanical transducer of claim 5 wherein said plurality of linkages comprises two flexures having a slot forming a tension relief beam proximate thereto.

7. The micromechanical transducer of claim 5 wherein said plurality of flexible linkages comprises two linkages between said mass of silicon and said substantially rectangular planar element.

8. The micromechanical transducer of claim 1 wherein said current carrying conductor comprises a first branch and a second branch, and wherein said first electric current flows through each of said first and second branch and said second and third electric currents flow through a first and a second one of said plurality of electrodes.

9. The micromechanical transducer of claim 8 wherein said first electric current is a fixed direct current.

10. The micromechanical transducer of claim 1 wherein said displaceable transducer element is an asymmetric plate flexibly attached to a frame by at least one flexible linkage.

11. The micromechanical transducer of claim 10 wherein said asymmetric plate has a first end and a second end and said first end is longer than said second end.

12. The micromechanical transducer of claim 11 wherein said first end comprises a layer of polysilicon disposed on an insulating layer which is disposed on said displaceable transducer element, said polysilicon layer serving to shift a center of gravity of said displaceable transducer element upwardly to decrease cross axis sensitivity of said displaceable transducer element.

13. The micromechanical transducer of claim 10 wherein said asymmetric plate has a first end and a second end of substantially equal length and said first end has a mass disposed thereon.

14. The micromechanical transducer of claim 1 wherein said displaceable transducer element is a gyroscopic transducer which comprises an outer gimbal flexibly attached to a frame and an inner gimbal flexibly attached to said outer gimbal.

15. The micromechanical transducer of claim 14 wherein said current carrying conductor is disposed on said outer gimbal.

16. The micromechanical transducer of claim 14 wherein said current carrying conductor is disposed on said inner gimbal.

17. The micromechanical transducer of claim 1 wherein said current carrying conductor is a coil configuration.

18. The micromechanical transducer of claim 1 wherein said plurality of electrodes comprises at least two bridge electrodes disposed above said displaceable transducer element.

19. The micromechanical transducer of claim 1 wherein said plurality of electrodes includes at least two buried electrodes disposed beneath said displaceable transducer element.

* * * * *